No. 780,609. PATENTED JAN. 24, 1905.
W. HOFFERT.
CULTIVATOR ATTACHMENT.
APPLICATION FILED APR. 23, 1904.
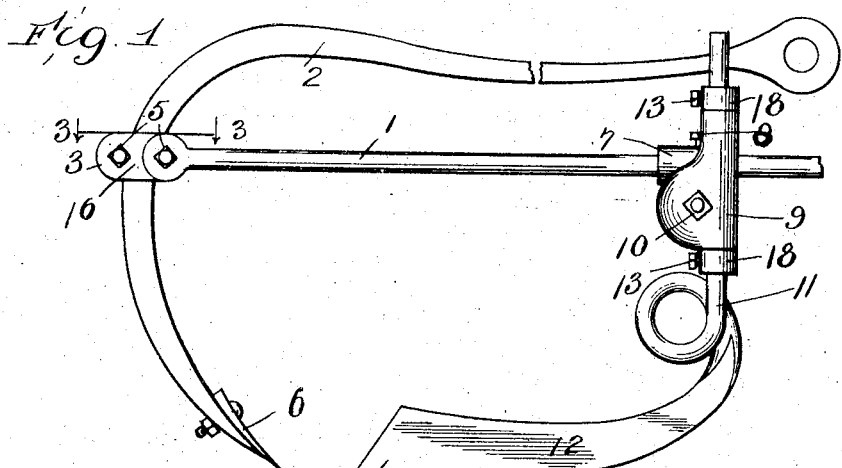
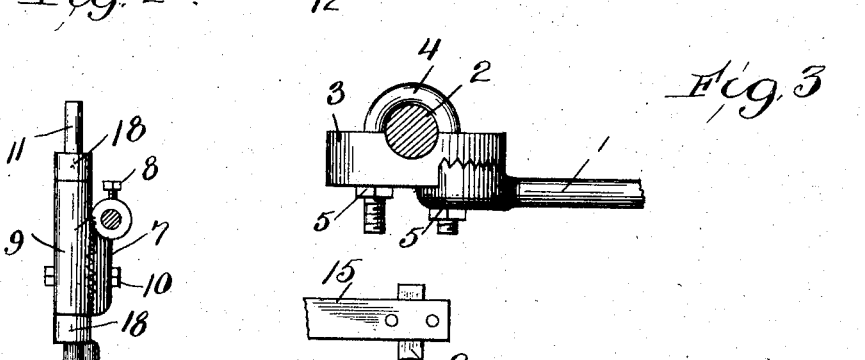
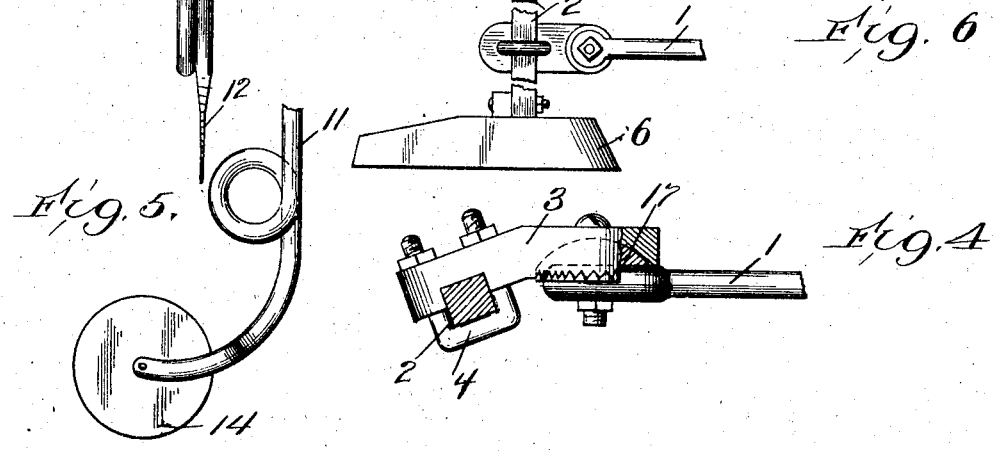
Witnesses:
Ray White
Cary R. White
Inventor:
William Hoffert,
By John M. O'Connor
Atty.

No. 780,609.

Patented January 24, 1905.

UNITED STATES PATENT OFFICE.

WILLIAM HOFFERT, OF ARLINGTON, ILLINOIS.

CULTIVATOR ATTACHMENT.

SPECIFICATION forming part of Letters Patent No. 780,609, dated January 24, 1905.

Application filed April 23, 1904. Serial No. 204,512.

*To all whom it may concern:*

Be it known that I, WILLIAM HOFFERT, a citizen of the United States, residing at Arlington, in the county of Bureau and State of Illinois, have invented new and useful Improvements in Cultivator Attachments, of which the following is a full, clear, concise, and exact description, reference being had to the accompanying drawings, forming a part of this specification.

My invention relates to cultivator attachments.

In the United States patent granted to me January 13, 1903, No. 718,350, I have described an attachment for cultivators, and the present application is for an improvement upon the attachment therein described and claimed and represents another species of my invention.

One of the objects of my invention is the provision of means for securing an attachment to cultivators in such a manner that the cutting edge of such attachment will readily adjust itself to crooked rows of grain and follow the cultivator-beam without the necessity of removing said cutting edge from the soil.

Another object of my invention is the provision of means for resiliently mounting a cultivator attachment adapted to cut weeds and morning-glory vines growing between the rows of grain.

A further object of my invention is the provision of means whereby such a cultivator attachment may be adjusted for traversing rolling or hilly ground.

The other novel features of my invention will more fully appear from the following description.

I have illustrated one form of my invention in the accompanying drawings, in which like reference characters indicate like parts in the several figures, and in which—

Figure 1 is a side elevation of my improved cultivator attachment. Fig. 2 is a full end view of the knife and its attaching means. Fig. 3 is a sectional view taken on the line 3 3 of Fig. 1. Fig. 4 is a modification of coupling shown in Fig. 3, showing a part of the attachment broken away. Fig. 5 is a modification of the blade, showing a disk for severing the vines and weeds. Fig. 6 is a full side view of my attachment secured to a different form of cultivator-beam.

Referring to the drawings by reference characters, a rod 1 is secured to any suitable cultivator-beam 2 (having secured thereto a shovel or share 6) by means of an adjustable clamp 16, said clamp preferably consisting of a block 3, secured to the beam by means of a U-shaped rod 4, set-nuts 5 5 securing said rod in position. The contiguous faces of the end of the rod 1 and the block 3 are roughened, as shown in Fig. 3, to permit the rod 1 to be adjusted radially with reference to its support.

Carried upon the free end of the rod 1 and adapted to move longitudinally thereon is a clamping-plate 7, having a set-screw 8 for securing same in position upon said rod. A perpendicularly-disposed sleeve 9 is secured to the clamping-plate 7 by means of a bolt 10, said sleeve being adjustable upon the plate 7 by means of roughened surfaces, as shown in Fig. 2. The sleeve 9 is adapted to contain a suitable support 11, to which is secured the cutting edge of the knife or colter 12, the support 11 and knife 12 being preferably formed in one piece, as shown in Fig. 1, though this is not essential. A coil or loop may be formed in the support 11, as shown in Figs. 1 and 5, to give additional resiliency to the cutting edge of the colter 12. The support 11 is loosely carried in the sleeve 9 and is preferably secured in position therein by collars 18 18, said collars being secured to said support by set-screws 13 13.

The roughened surfaces of the supporting end of the rod 1 and block 3 permit the free end of said rod to be raised or lowered to adjust the colter or knife 12 to sloping or hilly farms where it is desired to plow up or down a grade. Rod 1, carrying the colter 12, is resilient and permits the colter to adjust itself with reference to uneven or rolling ground, a greater degree of resiliency being obtained by raising or lowering the supporting-rod 1 than where the rod is in a horizontal position and the line of draft thereon in a horizontal plane.

It will be readily seen that the support 11 for the colter 12, being loosely carried by the perpendicular sleeve 9 and adapted to rotate or swing in said sleeve, will readily adjust itself to crooked places in the rows of grain and will follow the cultivator-beam in turning without the necessity of removing said blade from the soil.

The roughened surfaces of the clamping-plate 7 and supporting-sleeve 9 permit the blade 12 to be adjusted to permit the end 12' to cut deep into the soil or to permit the entire length of the cutting edge to penetrate an equal depth, as desired. This feature is important, as some growths of weeds are difficult to sever and others, such as morning-glory vines, may be readily severed without the necessity of the blade penetrating to the depth required in the case of a larger growth of weeds or vines. The collars 18 18 permit the blade or colter 12 to be raised or lowered relative to the supporting-rod 1 without interfering with the swivel movement of said blade, which permits the cultivator to readily turn at an angle in following a crooked row of grain.

In Fig. 5 I have illustrated the support 11 carrying a disk 14 for severing the weeds and vines in place of the blade 12, the support 11 being curved rearwardly to permit the disk 14 to move freely in its swiveled support or sleeve 9.

In Fig. 4 I have shown a modification of the clamp illustrated in Fig. 3, adapted for use with certain forms of cultivators having a square beam. The block 3 has an angle formed therein, and the rod 1 is secured thereto by means of a socket or cup-shaped connection 17, said connection having roughened surfaces, as shown in Fig. 4.

In Fig. 6 I have illustrated my attachment in connection with a different form of cultivator, the shovel 6 being carried by a straight beam having an extending arm 15.

It will be understood that one of my attachments is adapted to be secured to each cultivator-beam and to travel ahead of each cultivator shovel or share.

By "shovel" as used herein I contemplate any form of cultivator shovel or share or any equivalent device, and by the word "colter" I wish to be understood as meaning any desired form of blade or cutting edge.

While I have described my invention with particular reference to the details of construction, I am aware that many changes may be made in said details without departing from the spirit of my invention, and I claim the benefit of any such changes as fairly fall within the scope of my invention.

Having described my invention, what I claim as new, and desire to secure by Letters Patent, is—

1. An attachment for cultivators, comprising a colter adapted to travel in advance of the cultivator-shovel, and resilient means associated with said colter, and constituting a resilient mounting therefor, said colter being pivoted and adapted to move freely on its pivot.

2. A cultivator attachment, comprising a colter adapted to travel in advance of the cultivator-shovel, resilient means associated with said colter, and constituting a resilient mounting therefor, said colter being swiveled and freely movable upon its swivel, and means for vertically adjusting said colter.

3. A cultivator attachment, comprising a pivoted colter, freely movable upon its pivot and adapted to travel ahead of the cultivator-shovel, a rod, said rod constituting a resilient mounting for said colter, and means for adjustably securing said rod to the cultivator-beam.

4. A cultivator attachment, comprising a suitable colter adapted to travel in advance of the cultivator-shovel, a rod, said rod constituting a resilient mounting for said colter, said colter being swiveled and freely movable on its swivel, and resilient means disposed between said colter and said rod.

5. A cultivator attachment, comprising a pivoted colter, freely movable upon its pivot and adapted to travel ahead of the cultivator-shovel, a rod, said rod constituting a resilient mounting for the colter, means for adjustably securing said rod to the cultivator-beam, and means for adjusting said colter longitudinally on said rod.

6. A cultivator attachment, comprising a pivoted colter, freely movable upon its pivot and adapted to travel ahead of the cultivator-shovel, a rod, said rod constituting a resilient mounting for said colter, means for adjustably securing said rod to the cultivator-beam, and means for adjusting said colter radially with reference to its support.

In witness whereof I have hereunto subscribed my name in the presence of two witnesses.

WILLIAM HOFFERT.

Witnesses:
T. J. MEISEL,
LEWIS WALTER.